(No Model.)
C. A. ROMINGER.
PANTS GUARD.
No. 582,096.   Patented May 4, 1897.
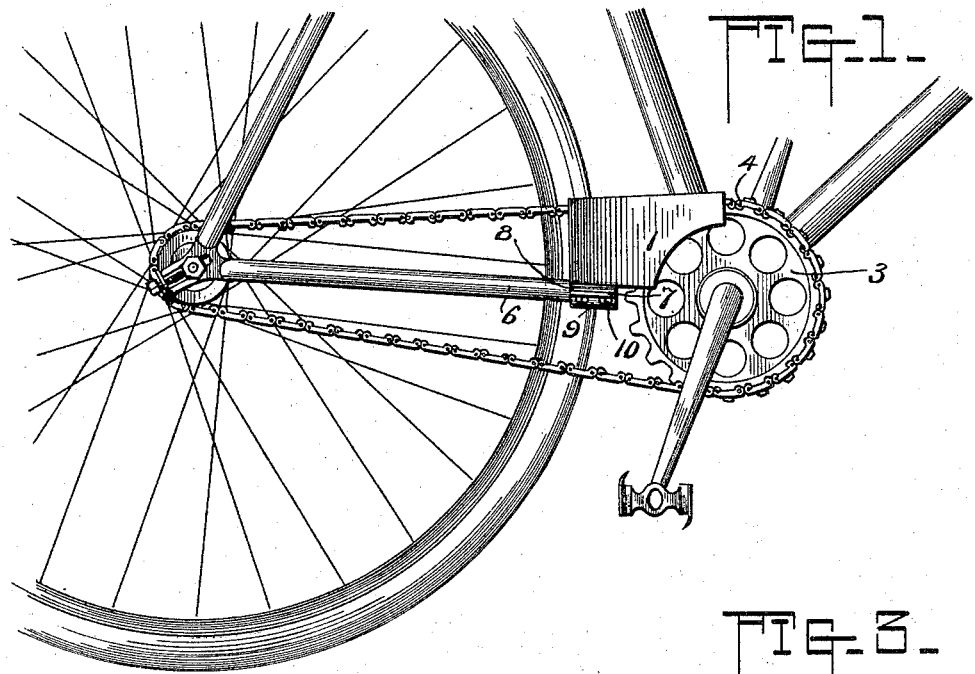
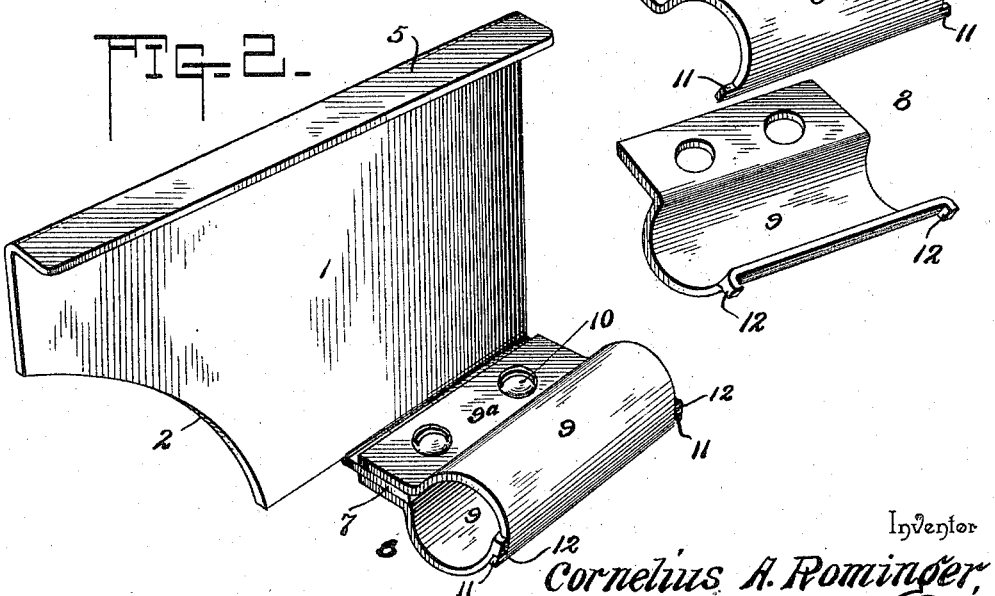
Inventor
Cornelius A. Rominger,
By his Attorneys,
C. A. Snow & Co.
Witnesses
A. K. Poynton.
R. M. Smith.

UNITED STATES PATENT OFFICE.

CORNELIUS A. ROMINGER, OF REIDSVILLE, NORTH CAROLINA.

PANTS-GUARD.

SPECIFICATION forming part of Letters Patent No. 582,096, dated May 4, 1897.

Application filed June 29, 1896. Serial No. 597,387. (No model.)

*To all whom it may concern:*

Be it known that I, CORNELIUS A. ROMINGER, a citizen of the United States, residing at Reidsville, in the county of Rockingham and State of North Carolina, have invented a new and useful Pants-Guard, of which the following is a specification.

This invention relates to pants-guards; and the object in view is to provide a simple, light, and inexpensive device of this character which may be readily applied to a bicycle adjacent to the front sprocket thereof for covering in a portion of said sprocket and the driving-chain, the object being to prevent the clothes of the rider becoming caught between the chain and sprocket and torn or otherwise injured.

One of the chief aims of the invention is to provide a novel form of clip by means of which the guard may be the more readily applied to the machine.

To this end the invention consists in a pants-guard for bicycles and similar vehicles embodying certain novel features and details of construction, as hereinafter fully described, illustrated in the drawings, and incorporated in the claim.

In the accompanying drawings, Figure 1 is a side elevation of a sufficient portion of a bicycle to illustrate the application of the improved guard thereto. Fig. 2 is a detail perspective view of the guard detached. Fig. 3 is a similar view of the clip-sections disassociated.

Similar numerals of reference designate corresponding parts in the several figures of the drawings.

Referring to the drawings, 1 designates the main body of the pants-guard, which is preferably formed from a piece of sheet metal and given a trapezoidal shape. The lower front corner of the body is formed with a segmental cut-out 2, by which the device is adapted to partially embrace the front sprocket-wheel 3 of an ordinary safety-bicycle.

The main body 1 extends upward to a point above the plane of the chain, (indicated at 4,) and the upper edge of the body is bent inward at substantially a right angle in order to form a substantially horizontal flange 5, which overlies the driving-chain and a portion of the sprocket-wheel, preventing the clothes of the rider from getting between the chain and sprocket-wheel at the point where the said chain meets with and begins to pass around said sprocket.

The lower edge of the body 1 is located in the proximal horizontal plane of the adjacent bottom run or rear fork side 6 of the machine-frame, and at this point the said lower edge is bent inward toward the frame to form an attaching-flange 7.

8 designates the attaching-clip, which is formed in two sections, each comprising a semicircular or half-sleeve portion 9, for partially embracing the said bottom run, and an outwardly-projecting ear $9^a$. These ears, together with the flange 7, are perforated to receive screws, bolts, or other fasteners 10, by which the clip and guard are secured together. One of the clip-sections is provided at its terminal edge with laterally-projecting shoulders 11, and the opposing section has radially or outwardly projecting shoulders 12, the shoulders of one section engaging those of the other section at the inner side of the bottom run. By loosening the fasteners 10 the shoulders 11 and 12 may be disengaged either for applying the pants-guard to the machine or detaching it therefrom.

It will be understood that the device is susceptible of various changes in the form, proportion, and minor details of construction, which may accordingly be resorted to without departing from the spirit or sacrificing any of the advantages of this invention.

Having thus described the invention, what is claimed as new is—

A pants-guard for bicycles, &c. consisting of a body portion of substantially trapezoidal shape having a segmental cut-out portion in its forward end, and provided along its upper edge with an inwardly-extending flange to cover the chain, and provided at its bottom edge also with an inwardly-projecting flange, and a clip consisting of two half-sleeves for embracing one of the forked sides, each half-sleeve having lugs projecting therefrom, the lugs on one half-sleeve adapted to interlock with those on the other half-sleeve to hold the half-sleeves together at one side, and each half-sleeve having also a laterally-projecting ear between which ears the inwardly-projecting flange at the bottom of the guard-plate is seated, and a series of suitable fastening devices passing through the said ears and intermediate flange to clamp them together, substantially as specified.

In testimony that I claim the foregoing as my own I have hereto affixed my signature in the presence of two witnesses.

CORNELIUS A. ROMINGER.

Witnesses:
    W. S. WHITTED,
    JOHN G. STAPLES.